United States Patent [19]

Oki et al.

[11] Patent Number: 5,446,627
[45] Date of Patent: Aug. 29, 1995

[54] METHOD OF PRODUCING A LIGHT CONDUCTIVE PLATE TYPE LIGHT SOURCE

[75] Inventors: Youji Oki, Yokohama; Atsuhiko Ushioda; Jiro Nishihara, both of Hadano, Japan

[73] Assignee: Stanley Electric Co., Ltd., Tokyo, Japan

[21] Appl. No.: 273,380

[22] Filed: Jul. 11, 1994

[30] Foreign Application Priority Data

Jul. 12, 1993 [JP] Japan .................................. 5-193888

[51] Int. Cl.⁶ .............................................. F21V 7/04
[52] U.S. Cl. ................................................. 362/31
[58] Field of Search ................................. 362/26, 31

[56] References Cited

U.S. PATENT DOCUMENTS 4,775,222 10/1988 Ohe .................................. 362/26

FOREIGN PATENT DOCUMENTS 0392863 10/1990 European Pat. Off. .
0501761 9/1992 European Pat. Off. .
2240636 8/1991 United Kingdom .
2249814 5/1992 United Kingdom .

*Primary Examiner*—Carroll B. Dority
*Attorney, Agent, or Firm*—Weingarten, Schurgin, Gagnebin & Hayes

[57] ABSTRACT

A method of producing a light conductive plate type light source, at least one light diffusing plate and a light reflecting plate are placed on the opposite illuminating surfaces of a light conductive plate in the overlapped state, and subsequently, a plurality of fixing members are press-fitted into the light conductive plate through the light diffusing plate and/or through the light reflecting plate with the aid of supersonic vibration applied to each fixing member. Thus, a securing operation can be achieved for the light conductive type light source at a remarkably improved efficiency regardless of the number of light diffusing plates to be placed on the light conductive plate in the overlapped state. In addition, the light conductive type light source can be produced at a reduced cost because no double-sided adhesive tape is required, and moreover, no supersonic welding operation is performed for each plate.

7 Claims, 2 Drawing Sheets

METHOD OF PRODUCING A LIGHT CONDUCTIVE PLATE TYPE LIGHT SOURCE

BACKGROUND OF THE INVENTION

1. Field of the Invention

The present invention relates generally to a method of producing a light conductive plate type light source. More particularly, the present invention relates to a method of producing a light conductive plate type light source preferably employable as a back light source for a liquid crystal .display unit which is widely used as a display section for a television, an office automation equipment or the like at present.

2. Background Art

To facilitate understanding of the present invention, a conventional method of producing a light conductive plate type light source of the foregoing type will be described below with reference to FIG. 4.

FIG. 4 shows by way of fragmentary enlarged sectional view the structure of a light conductive plate type light source 90 produced by employing the conventional method. As is apparent from the drawing, the light conductive plate type light source 90 includes a light conductive plate 91 which is formed of a high transparent material such as an acrylic resin, and at least one sheet-shaped light diffusing plate 92 is secured to the light conductive plate 91 on a front surface 91a side while coming in substantially close contact with the light conductive plate 91 so as to allow a light beam to be emitted from the front surface 91a of the light conductive plate 91 with excellent uniformity, while a sheet-shaped light reflecting plate 93 is secured to the light conductive plate 91 on a rear surface 91b side of the light conductive plate 91 in order to improve a lighting efficiency of the light conductive plate type light source 90.

The light conductive plate 91 and the light diffusing plate 92 (or the light reflecting plate 93) are adhesively secured to each other with double-sided adhesive tapes 94 interposed therebetween. In the case that a plurality of light diffusing plates 92 are used for the light conductive plate type light source 90 in order to improve a light diffusing property of the latter, the same securing operation to be achieved using double-sided adhesive tapes 94 as mentioned above is repeated to build a laminated structure with the light diffusing plates 92.

Next, another conventional method of producing a light conductive plate type light source will be described below with reference to FIG. 5.

FIG. 5 shows by way of fragmentary enlarged sectional view the state that three light diffusing plates 92 are placed on a light conductive plate 91 in the overlapped state at a predetermined position relative to the light conductive plate 91, and while this overlapped state is maintained, both the light conductive plate 91 and the light dispersing plates 92 are welded together by operating a supersonic welding machine 80 from the light diffusing plate 92 side without any use of double-sided adhesive tape. At this time, in the case that a plurality of light diffusing plates 92 are used for the light conductive plate type light source 90, there rises an occasion that a welding operation is completed merely by way of a single step. In practice, since it is very difficult that a plurality of light diffusing plates 92 are welded together without any fluctuation in strength, the light diffusing plates 92 are usually welded together one by one in such a manner that a subsequent light diffusing plate 92 is welded to the preceding light diffusing plate which has been already welded to the underlying light diffusing plate.

However, the above-described conventional methods have the following problems. Since both-sided adhesive tapes 94 are used for achieving each securing operation, an extra quantity of adhesive is liable of flowing outside of the laminated structure. For this reason, it is required that each securing operation is carefully performed. This leads to a problem that a securing operation is achieved for the light conductive plate type light source 90 at an increased cost. Other problem is that a gap substantially equal to a thickness of the double-sided adhesive tape 94 arises between the light conductive plate 91 and the light diffusing plate 92, causing the light diffusing plate 92 to be concavely warped, resulting in a quality of appearance of the light conductive plate type light source 90 being degraded. Another problem is that when a repairing operation is required after completion of a incorrect securing operation, an adhesive remaining on the double-sided adhesive tape 94 should be removed from the light conductive plate 91 while consuming a long time and many manhours.

In the case that a supersonic welding machine is employed for achieving each securing operation, it is necessary that a material constituting the light conductive plate 91 and a material constituting the light diffusing plate 92 can be welded to each other. Since a polyethylene terephthalate resin having an excellent light diffusing property, i.e., a typical material, employable for the light diffusing plate 92, can not be welded to the material constituting the light conductive plate 91, there arises a problem that the kinds of materials employable for the light conductive plate, the light diffusing plate 92, and the light reflecting plate are limitatively determined. Once the light conductive plate 91 and the light diffusing plate 92 are welded to each other, it is impossible to perform a repairing operation for the light conductive plate type light source 90. In addition, as the number of light diffusing plates 92 increases, manhours required for achieving a securing operation proportionally increases regardless of the type of method employed for weldably securing both the light conductive plate 91 and the light scattering plates 92 together. Thus, there arises a problem that the light conductive plate type light source 90 having a plurality of light diffusing plates is produced at an increased cost.

SUMMARY OF THE INVENTION

The present invention has been made in consideration of the aforementioned background.

An object of the present invention is to provide a method of producing a light conductive plate type light source wherein the method can be practiced at a reduced cost because no double-sided adhesive tape is required and no supersonic welding operation is performed for placing at least one light diffusing plate and a light reflecting plate on a light conductive plate in the overlapped state.

Another object of the present invention is to provide a method of producing a light conductive type light source wherein the method can be practiced at a high efficiency because a plurality of light diffusing plates can simultaneously be press-fitted to the light conductive plate regardless of the number of light diffusing plates to be placed on the light conductive plate in the overlapped state.

The present invention provides a light conductive plate type light source wherein at least one light diffusing plate and a light reflecting plate each prepared in the form of a sheet-shaped member are secured to the opposite illuminating surfaces of a light conductive plate while coming in substantially close contact with them, wherein the method comprises the steps of placing the light diffusing plate and the light reflecting plate on the opposite illuminating surfaces of the light conductive plate in the overlapped state at a predetermined position relative to the light conductive plate, and press-fitting a plurality of fixing members into the light conductive plate through the light diffusing plate and/or through the light reflecting plate with the aid of supersonic vibration applied to each fixing member.

It is preferable from the viewpoint of a reduced production cost that the supersonic vibration is induced by a supersonic welding machine.

Usually, a plurality of light diffusing plates are placed on the front illuminating surface of the light conductive plate in the overlapped state.

It is preferable from the viewpoint of reliable press-fitting that each of the fixing members is prepared in the form of an eyelet-shaped hollow rivet made of a metallic material and having a radially expanded retaining flange portion.

Alternatively, each fixing member may be prepared in the form of a staple-shaped fixing member which is formed by bending a wire to exhibit a substantially inverted U-shaped contour.

Otherwise, each fixing member may be prepared in the form of a nail-shaped fixing member.

With such construction as mentioned above, in the case that a plurality of light diffusing plates are placed on the light conductive plate in the overlapped state, it is possible to simultaneously press-fit them to the light conductive plate, resulting in a securing operation being achieved for the light conductive plate type light source at a remarkably improved efficiency compared with the conventional method wherein a plurality of light diffusing plates are fixedly secured to the light conductive plate one by one. Consequently, the light conductive plate type light source can produced at a reduced cost.

Since the light diffusion plates and the light reflecting plate are fixedly secured to the light conductive plate using a plurality of fixing members, there does not arise a necessity for taking account of weldability or adhesiveness between the light conductive plate and the light diffusing plate, it is possible to select an optimum material for each of the light conductive plate and the light diffusing plate as desired. This leads to the result that performances of the light conductive plate type light source can be improved.

In addition, in contrast with the conventional method wherein the light conductive plate and the light diffusion plate are fixedly secured to each other by using double-sided adhesive tapes or by simultaneously welding them together, the method of the present invention assures that the light conductive plate type light source exhibit excellent durability at an elevated temperature, resulting in reliability of the light conductive plate type light source being improved.

Other objects, features and advantages of the present invention will become apparent from reading of the following description which has been made in conjunction with the accompanying drawings.

DETAILED DESCRIPTION OF THE PREFERRED EMBODIMENTS

The present invention will now be described in detail hereinafter with reference to FIG. 1 to FIG. 3 which illustrate a preferred embodiment thereof.

Figure 1:
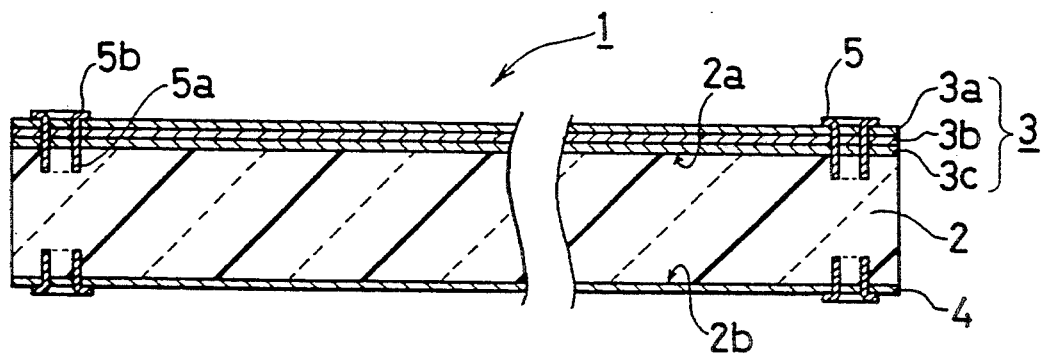
FIG. 1 is a fragmentary enlarged sectional view of a light conductive plate type light source in the completely assembled state wherein a method of producing the light conductive plate type light source in accordance with an embodiment of the present invention is employed.

In FIG. 1, reference numeral 1 designates a light conductive plate type light source for which a method of producing the light conductive plate type light source in accordance with the embodiment of the present invention is employed. A light diffusing plate 3 prepared in the form of a sheet-shaped member is secured to a light conductive plate 2 on a front surface 2a side of the latter, while a light reflecting plate 4 is secured to the light conductive plate 2 on a rear surface 2b side of the latter.

A characterizing feature of the present invention consists in that a plurality of fixing members 5 are used for securing the light diffusing plate 3 to the front surface 2a of the light conductive plate 2 and/or for securing the light reflecting plate 4 to the rear surface 2b of the light conductive plate 2. It is preferable from the viewpoint of easy handling as well as purchasing at an inexpensive cost that a plurality of hollow rivets each made of a metallic material and commercially available as a so-called eyelet rivet are used for the fixing members 5.

A procedure of securing the light diffusing plate 3 (or the light reflecting plate 4) to the surface 2a (or 2b) of the light conductive plate 2 using the fixing members 5 will be described below.

Figure 2:
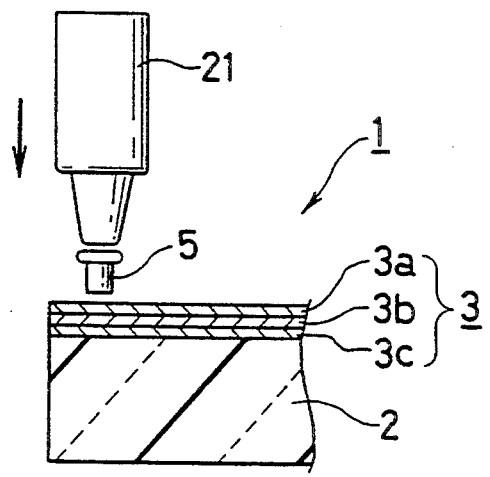
FIG. 2 is a fragmentary enlarged sectional view of the light conductive plate type light source, showing a working step of fitting a fixing member into a light conductive plate according to the present invention.

First, as shown in FIG. 2, the light diffusing plate 3 (or the light reflecting plate 4) is placed on the light conductive plate 2 in the overlapped state at a predetermined position relative to the light conductive plate 2. Provided that e.g., three light diffusing plates 3a to 3c are used in place of a single light diffusing plate 3, it is obvious that the three diffusing plates 3a to 3c should simultaneously be placed on the front surface 2a of the light conductive plate 2 in the overlapped state.

After the light diffusing plate 3 (or the light reflecting plate 4) is placed on the surface 2a (or 2b) of the light conductive plate 2 in the overlapped state at a predetermined position relative to the light conductive plate 2, a plurality of fixing members 5 are press-fitted into the light conductive plate 2 through the light diffusing plate 3 (or through the light reflecting plate 4) at adequately predetermined positions. Each press-fitting is achieved by applying supersonic waves to each fixing member 5, causing the latter to vibrate so as to allow the light conductive plate 2, the light diffusing plate 3 and the light reflecting plate 4 to be fused together in the presence of the frictional heat induced by supersonic vibration of the fixing members 5.

To confirm effectiveness of the method of the present invention, the inventor conducted a series of experiments, and the results derived from these experiments are noted below.

A currently available supersonic welding machine having an output of 450 W was employed as a supersonic generating source. In operation, the fixing members 5 were successively press-fitted in the light conductive plate 2 with the aid of a horn 21 of the supersonic welding machine without any necessity for preliminarily forming holes through the light diffusing plate 3 and the light reflecting plate 4 as well as holes in the light conductive plate 2 so that the fitting members 5 passed through the light diffusing plate 3 and the light reflecting plate 4, and subsequently, they were embedded in the light conductive plate 2. It was found that each press-fitting operation was not adversely affected by the number of light diffusing plates 3 and each light diffusing plate 3 having a comparatively small thickness was not deformed in the shape of wrinkle, warpage or the like on completion of each press-fitting operation.

After completion of the squeezing operation, it was confirmed that the fixing members 5 were firmly held in the light conductive plate 2 with their foot portions 5a when the molten part of the light conductive plate 2 was solidified. In addition, the light diffusing plate 3 was firmly retained on the light conductive plate 2 with radially expanded flange portions 5b of the fixing members 5. Thus, in the case that e.g., a polyethylene terephthalate resin originally unable to be welded to the light conductive plate 3 made of an acrylic resin is employed as a material for the light diffusing plate 3, both the light conductive plate 2 and the light diffusing plate 3 can reliably be fixedly secured to each other.

As is apparent from the above description, in contrast with the conventional methods, the method of the present invention assures that a light conductive plate type light source can be produced at a very high yielding rate. However, there arises an occasion that a repairing operation is required due to, e.g., physical failure of the light diffusing plate 3 itself. At this time, it is recommendable that the repairing operation is achieved by removing the light diffusing plate 3 from the light conductive plate 2 and then exchanging the light diffusing plate 3 with a new one.

Figure 3:
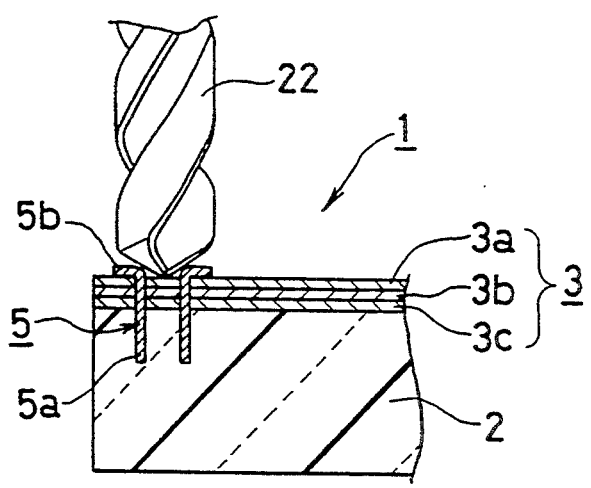
FIG. 3 is a fragmentary enlarged sectional view of the light conductive plate type light source, showing a step of cutting a part of the fixing member for removing light diffusing plates from the light conductive plate according to the present invention.
Figure 4:
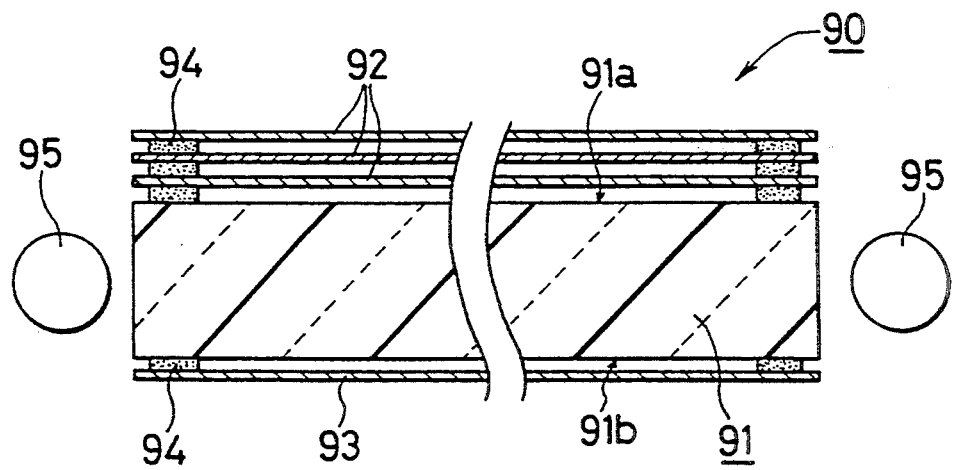
FIG. 4 is a fragmentary enlarged sectional view of a light conductive plate type light source for which a conventional method of producing the light conductive plate type light source by using double-sided adhesive tapes is employed.
Figure 5:
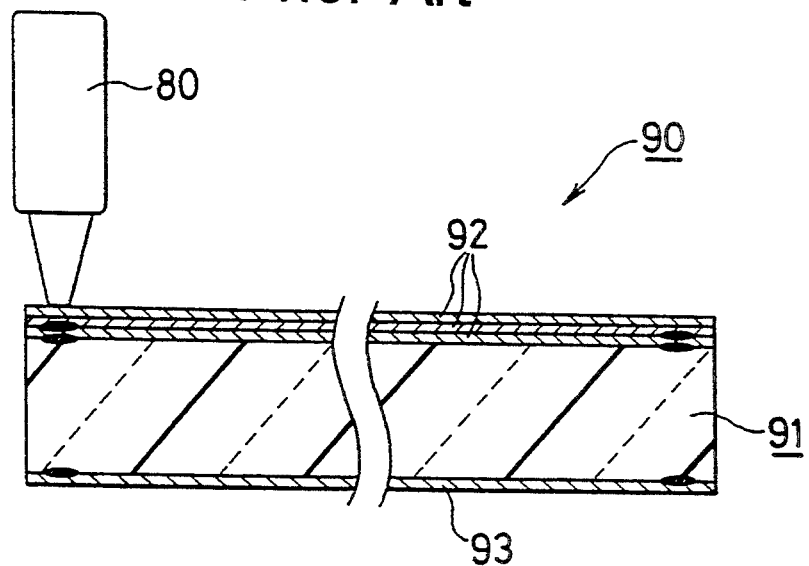
FIG. 5 is a fragmentary enlarged sectional view of a light conductive plate type light source for which another conventional method of producing the light conductive plate type light source by operating a supersonic welding machine is employed.

FIG. 3 shows by way of fragmentary enlarged sectional view a step of removing the light diffusing plate 3 from the light conductive plate 2 for performing a repairing operation. To execute steps of removing and exchanging, cutting blades of a drill 22 are brought in contact with the head part of each fixing member 5 and then rotated to remove the radially expanded flange portion 5b of each fixing member 5 from a main body of the latter. On completion of the cutting operation, the light diffusing plate 3 can easily be removed from the light conductive plate 3 in order to exchange the light diffusing plate 3 with a new one.

In this embodiment, eyelet-shaped hollow rivets each having a radially expanded flange portion are used for the fixing members 5. However, the present invention should not be limited only to the eyelet-shaped hollow rivets. Alternatively, staple-shaped fixing members each formed by bending a wire to exhibit a substantially inverted U-shaped contour may be substituted for the eyelet-shaped hollow rivets. Otherwise, nail-shaped fixing members may be substituted for the eyelet-shaped hollow rivets. Provided that it is assured that the light diffusing plate 2 can reliably be secured to the light conductive plate 3 (or the light reflecting plate 4), any type of fixing member is acceptable.

While the present invention has been described above with respect to a single preferred embodiment thereof, it should of course be understood that the present invention should not be limited only to this embodiment but various change or modification may be made without any departure from the scope of the present invention as defined by the appended claims.

What is claimed is:

1. A method of producing a light conductive plate type light source wherein at least one light diffusing plate and a light reflecting plate each prepared in the form of a sheet-shaped member are secured to the opposite illuminating surfaces of a light conductive plate while coming in substantially close contact with them, comprising the steps of;

placing said light diffusing plate and said light reflecting plate on the opposite illuminating surfaces of said light conductive plate in the overlapped state at a predetermined position relative to said light conductive plate, and press-fitting a plurality of fixing members into said light conductive plate through said light diffusing plate and/or through said light reflecting plate with the aid of supersonic vibration applied to each fixing member.

2. The method as claimed in claim 1, wherein said supersonic vibration is induced by a supersonic welding machine.

3. The method as claimed in claim 1, wherein a plurality of light diffusing plates are placed on the front illuminating surface of said light conductive plate in the overlapped state.

4. The method as claimed in claim 1, wherein three light diffusing plates are placed on the front illuminating surface of said light conductive plate in the overlapped state.

5. The method as claimed in claim 1, wherein each of said fixing members is an eyelet-shaped hollow rivet made of a metallic material and having a radially expanded retaining flange portion.

6. The method as claimed in claim 1, wherein each of said fixing members is a staple-shaped fixing member which is formed by bending a wire to exhibit a substantially inverted U-shaped contour.

7. The method as claimed in claim 1, wherein each of said fixing members is a nail-shaped fixing member.

* * * * *